United States Patent [19]
Maehara

[11] 3,754,241
[45] Aug. 21, 1973

[54] APPARATUS FOR MEASURING PHASE DIFFERENCE

[75] Inventor: Osamu Maehara, Kawasaki, Japan
[73] Assignee: Ona Sakki Co., Ltd., Tokyo, Japan
[22] Filed: Oct. 26, 1971
[21] Appl. No.: 192,200

[30] Foreign Application Priority Data
Oct. 27, 1970 Japan.............................. 45/93977

[52] U.S. Cl......... 340/347 SY, 340/207, 324/83 D, 235/92 PS
[51] Int. Cl....................... G01r 25/00, H03r 13/02
[58] Field of Search............................ 340/347 SY; 235/92 PS, 92 CC; 324/83 D

[56] References Cited
UNITED STATES PATENTS
3,364,480  1/1968  Roth........................... 340/347 SY
3,549,870  12/1970  Lay................................ 235/92 PS Primary Examiner—Thomas A. Robinson
Attorney—Stowell & Stowell

[57] ABSTRACT

Apparatus for measuring phase differences of a rotating shaft by detecting a pair of generated AC frequencies adjacent the periphery of a tooth-wheel rotating at a fixed speed, even though the phase difference of the AC signals is greater or smaller that $2\pi$.

7 Claims, 5 Drawing Figures

3,754,241

APPARATUS FOR MEASURING PHASE DIFFERENCE

This invention relates to apparatus for measuring electrical phase difference, especially the phase difference of an electrical angle greater than 2π.

The invention will be more particularly described in reference to the accompanying drawing wherein.

Figure 1:
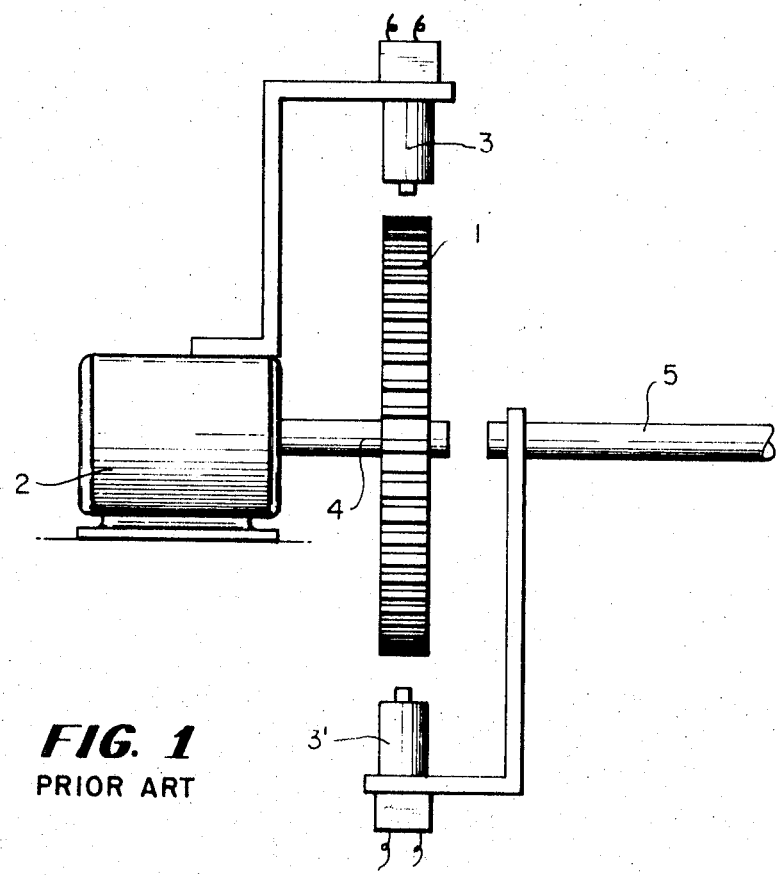
FIG. 1 illustrates an example of the principal structure of the known apparatus for measuring a micro rotating angle.

The apparatus for measuring a micro rotating angle is known in the art as shown, for example, in FIG. 1 of the drawings.

Referring now to the drawing in more detail, 1 is a rotating disc made of a magnetic material, the exterior circumference of which has been provided with toothed protuberances at a constant pitch. 2 is a driving motor for the said rotating disc. 3 is an electromagnetic pickup comprising a detecting coil and a permanent magnet forming a magnet flux which intersects the said detecting coil. The said electromagnetic pickup 3 is situated facing the toothed proturberances on the exterior circumference of the said rotating disc 1 at a proper distance. 3' is another electromagnetic pickup comprising a detecting coil and a permanent magnet like the said electromagnetic pickup 3. The said electromagnetic pickup 3' is fixed on a rotary shaft 5 facing the toothed protuberances on the exterior circumference of the said rotating disc 1 at a proper distance. The said rotating shaft 5 has the same center as that of a rotary shaft 4 for the said rotating disc 1, but can rotate independently, and thereby the said rotating disc 1 is allowed to revolve freely without contacting the said electromagnetic pickups 3 and 3'. The said electromagnetic pickup 3' can also revolve around the said rotating disc 1 in accordance with the rotation of the said rotaty shaft 5 within a range where it does not come into contact with the said electromagnetic pickup 3.

A subject being measured is connected to the said rotary shaft 5. The subject is, for example, the supporting bar of an automatic weighing machine for measuring heavy materials. It is known in the art of the automatic weighing machine that the bar is so constructed that it begins rotating from the state of response in accordance with the difference in weight between the subject being measured and the reference weight. Therefore, the said rotary shaft 5 is connected to the bar of the automatic weighing machine so that the former can rotate in accordance with the rotating angle of the latter.

Suppose the said rotating disc 1 is turned at a constant angular velocity by the said driving motor 2, the magnetic reluctance of the said rotating disc 1 against the magnetic flux from the said electromagnetic pickups 3 and 3' changes in accordance with the toothed protuberances on the exterior circumference of the said rotating disc 1. Thus, the density of the magnetic flux intersecting the detecting coil built in each of the said electromagnetic pickups 3 and 3' is caused to change and thereby an AC signal having the same and constant frequency is derived from each of these two pickups. There is a phase difference between the AC signals determined by the position having a mechanical and mutual relationship between the said electromagnetic pickups 3 and 3'.

When rotating the said rotary shaft 5 in accordance with the angular displacement of a subject being measured, the said electromagnetic pickup 3' revolves around the said rotating disc 1, causing the position having a mechanical and mutual relationship between the said electromagnetic pickups 3 and 3' to change and thereby the phase difference of the AC signal derived from each of these two electromagnetic pickups is caused to change. Therefore, the rotating angle of the said rotary shaft 5 can be determined or measured by detecting the change of the phase difference. Also, the angular displacement of the subject being measured can be obtained from the rotating angle of the said rotary shaft 5 by detecting the change of the phase difference.

Figure 2:
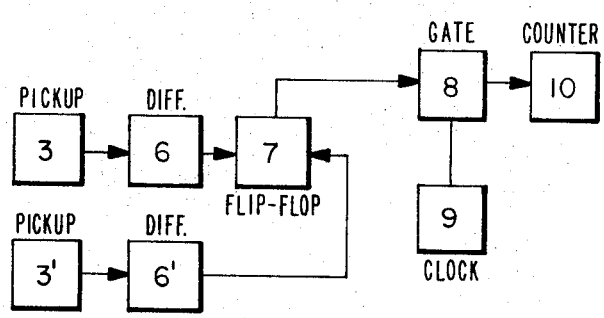
FIG. 2 illustrates in block form an example of the circuit for processing signals detected by the said apparatus.

FIG. 2 is a block diagram showing an example of the known circuit for detecting the change of the phase difference described in the preceding paragraph. In the drawing, 3 and 3' are electromagnetic pickups illustrated and described in FIG. 1. 6 and 6' are differentiation circuits. 7 is a flip-flop circuit. 8 is a gate circuit. 9 is a clock pulse generator. 10 is a counter.

Specifically, the AC signal outputs of the said electromagnetic pickups 3 and 3' are differentiated individually by the said differentiation circuits 6 and 6', and, for example, only positive differential pulse signals of each signal thus differentiated are taken out and fed to the said flip-flop circuit 7. The actuation of the said gate circuit 8 is controlled, in turn, by the output signals of the said flip-flop circuit 7.

The said gate circuit 8 is put into a conducting state by the output signal of the said flip-flop circuit 7, which matches, for example, the differential pulse signal derived from the said differentiation circuit 6 and it is disabled by the output signal matching the differential pulse signal derived from the said differentiation circuit 6'. The duration of the conductance of the said gate citcuit 8 becomes proportional to the phase difference of the AC signals taken out of the said electromagnetic pickups 3 and 3'. Therefore, the phase difference of the output AC signals of the said electromagnetic pickups 3 and 3' can be obtained by computing the number of clock pulse signals, i.e., pulse signals generated by the clock pulse generator, passing through the said gate circuit 8 when it is in a conducting state and applied to the counter 10.

As described hereinbefore, when the change of the phase difference of the output AC signals of the said two electromagnetic pickups 3 and 3' occurs as a result of the change in the position having a mechanical and mutual relationship between these two electromagnetic pickups, the phase difference of the output differential pulse signals of the said differentiation circuits 6 and 6' is also changed in accordance with the change in phase difference of the output AC signals of the said electromagnetic pickups 3 and 3', causing the duration of the conductance of the said gate circuit 8 to change accordingly. Therefore, the change of phase difference can be obtained by reading the indication of the said counter 10 at that time. When detecting the phase difference using the circuit illustrated and described in FIG. 2, when, the rotating angle of the said electromagnetic pickup 3' becomes great particularly if the phase difference of the output AC signals of the said electromagnetic pickups 3 and 3' is greater than $2\pi$, for instance, $2\pi + \theta$, the phase difference detected is not $2\pi + \theta$ but $\theta$. In other words, the detection is limited to a small rotating angle within a pitch of the toothed protuberances on the exterior circumference of the said rotating disc 1 illustrated in FIG. 1.

It may be possible to expand the detective range of a rotating angle by coarsing the pitch of the toothed protuberances on the exterior circumference of the said rotating disc 1. However, this is not practical as the detecting accuracy deteriorates also.

It is accordingly an object of the invention to provide an improved apparatus for measuring phase difference whereby the rotating angle of the said electromagnetic pickup 3' can be detected electrically even if it rotates over the plural number of pitches of the toothed protuberances on the exterior circumference of the said rotating disc 1 illustrated in FIG. 1.

It is a further object of the invention, generally speaking, to provide an apparatus for measuring phase differences capable of detecting the phase difference of the two AC signals even if it is smaller or greater than $2\pi$ radiens.

Electrically, the phase difference of the two AC signals are always handled within a range less than $2\pi$. For example, the phase difference of $2\pi + \theta$ is handled as equal to the phase difference of $\theta$. However, when electrically measuring a rotating angle over several pitches of the toothed protuberances of the said rotating disc 1 with the angular displacement measuring apparatus as shown in FIG. 1, it is necessary to distinguish a phase difference of $2\pi + \theta$ from that of $\theta$. Further, when detecting the phase difference of $4\pi + \theta$, it is needed to discriminate it from the phase difference of $\theta$. It is, therefore, another object of the invention to provide an improved apparatus making it possible to carry out such detection.

The rotating angle detecting accuracy can be increased by providing the rotating disc 1 illustrated in FIG. 1 with fine teeth or prptuberances on the exterior circumference. Therefore, by using the apparatus according to the invention with the apparatus as shown in FIG. 1, the detecting range of a rotating angle can be expanded up to greater than $2\pi$ in a mechanical angle while retaining high detecting accuracy.

A better understanding of this invention may be had from the following detailed description when read in connection with the accompanying drawings.

Figure 3:
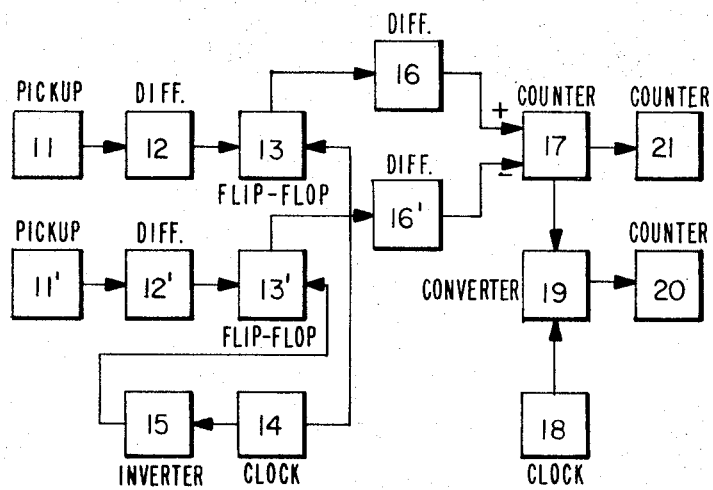
FIG. 3 illustrates in block form an example of preferred embodiments of the apparatus according to the invention.

Referring now to FIG. 3 of the drawings, there is shown in block form an example of preferred embodiments according to the invention, wherein:

11 and 11' are the sources of the generation of AC signals which correspond, for example, to the said electromagnetic pickups 3 and 3';

12 and 12' are differentiation circuits;

13 and 13' are flip-flop circuits;

14 is a clock pulse generator;

15 is a phse inverting circuit;

16 and 16' are differentiation circuits;

17 is a reversible counter which, for example, utilizes pulse signals from the said differentiation circuit 16 as add input signals and those from the said differentiation circuit 16' as subtract input signals respectively;

18 is a clock pulse generator;

19 is a frequency converting circuit or rate multiplier;

20 is a counter; and 21 is a polarity discriminating circuit for the phase difference being measured, comprising, for example, a reversible counter.

Figure 4:
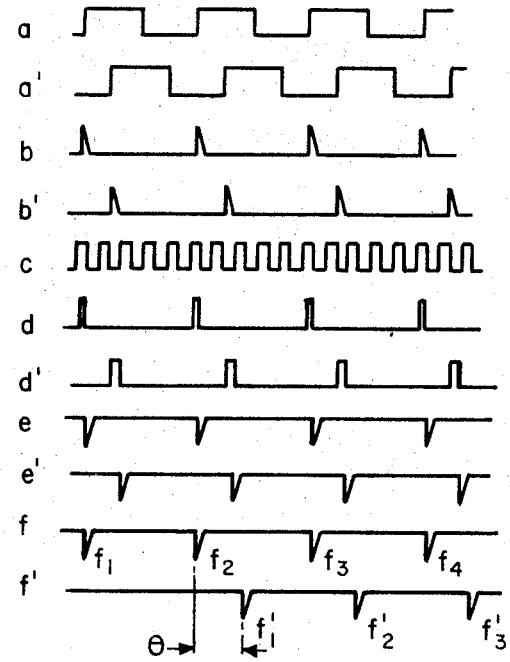
FIG. 4 illustrates a wave form for explaining the theory of operation of the said apparatus according to the invention.

Suppose each output signal of the said AC signal generators 11 and 11' is a square wave signal having the same frequency as shown, for example, in FIG. 4(a) and 4(a') and having a certain phase difference. Each output signal is differentiated individually by the said differentiation circuits 12 and 12' and, for example, only the positive pulse signals as shown in FIG. 4(b) and 4(b') are derived therefrom and fed to the said flip-flop circuits 13 and 13' respectively. Furthermore, either of the said flip-flop circuit 13 or 13', for example, the former is reset directly by applying to it the output pulse signal (as shown in FIG. 4(c)) of the said clock pulse generator 14.

On the other hand, the output pulse signal of the said clock pulse generator 14 is supplied to the said flip-flop circuit 13' through the said phase inverting circuit 15 in order to reset it.

Thus, by setting and resetting the said flip-flop circuits 13 and 13' individually, the output signal of the former is as shown in FIG. 4(d) and that of the latter is as illustrated in FIG. 4(d') respectively. When differentiating these output signals individually with the said differentiation circuits 16 and 16' and then deriving therefrom only the negative pulse signals, such negative pulse signals as shown in FIG. 4(e) and 4(e') can be obtained. When selecting the repetition period of the output pulse signal (as shown in FIG. 4(c)) of the clock pulse generator 14 which is sufficiently shorter than the repetition period of signals being measured (as shown in FIGS. 4(a) and 4(a')), the phase difference of the output negative pulse signals (as shown in FIGS. 4(e) and 4(e') of the said differentiation circuits 16 and 16' can be matched with that of the signals being measured (as shown in FIGS. 4(a) and 4(a') with practically sufficient accuracy.

As described hereinbefore, the said flip-flop circuit 13 directly utilizes the output signals of the said clock pulse generator 14 as its reset signal and the said flip-flop circuit 13' uses the output signals of the said clock pulse generator 14 with their phase inverted as its reset signal respectively. In other words, each reset signal of the said flip-flop circuits 13 and 13' has an anti-phase relationship to each other, and therefore the output negative pulse signals of the said differentiation circuits 16 and 16' (FIGS. 4(e) and 4(e')) are asynchronized completely with each other (i.e., they do not have the same phase when the phase difference is greater than $2\pi$) and prevent the reversible counter 17 which will be described hereinafter from making an erratic operation.

Suppose the initial reading of the reversible counter 17 is $n$, the reading will be $n+1$ when the first pulse signal of the output signal (FIG. 4(e)) of the said differentiation circuit 16 is supplied to the counter as an add input signal. When the first pulse signal of the output signals (FIG. 4(e')) of the said differentiation circuit 16' is supplied to the said counter 17 as a subtract input signal, the reading will return to n. Likely, every time the output negative pulse signals of the said differentiation circuits 16 and 16' are alternately supplied to the said reversible counter 17, the indication on the counter will be n+1 and n alternately. As shown in FIGS. 4(e) and 4(e'), if delay of the phase of e' against e, i.e., a phase difference, is kept small, the time holding the indication of n on the said reversible counter will be longer than that of n+1. As the delay is increased close to π, the time holding the indication of a n becomes shorter gradually, although it is still longer than the time holding the indication of n+1. If the phase difference between e and e' is π, the time holding the indication of n will be equal to that of n+1. If the phase difference is greater than π, the time holding the indication of n+1 will be longer than that of n.

FIGS. 4(f) and 4(f') illustrate the output negative pulse signals of the said differentiation circuits 16 and 16' with a phase difference between the AC signals of 2π plus θ. When matching f2 pulse signal of the f pulse train to f'1 pulse signal of the f' pulse train, the phase difference between these two pulse trains will be θ less than 2π. When matching f1 pulse signal of the f pulse train to f'1 pulse signal of f' pulse train, the phase difference between the two pulse trains will be 2π + θ.

The apparatus according to the invention is capable of detecting and measuring the phase difference greater than 2π. That is, when supplying the f1 pulse signal of the f pulse train to the said reversible counter 17, the initial indication on the counter will change from n to n+1. When the next f2 pulse signal of the f pulse train is supplied to the reversible counter 17, the indication will change from n+1 to n+2. When a further f'1 pulse signal of f' pulse train is supplied to the counter, the indication will change to n+1. Thus, the reversible counter 17 will indicate n+2 and n+1 alternately and as the phase difference becomes greater within a range from 2π to 4π, the time holding the indication of n+2 will be longer. If the phase difference between these two pulse trains is within a range from 4π to 6π, the reversible counter 17 will indicate n+3 and n+2 alternately. The same indication consideration as above may be taken even if the phase difference is greater than 6π.

If the phase difference of these two pulse trains is smaller than 2π as shown in FIGS. 4(e) and 4(e'), and the phase of e is delayed against that of e' counter to phase relationship illustrated in FIG. 4, the reversible counter 17 indicates n−1 and n alternately. Like f and f' illustrated in FIG. 4, if f runs behind f' while the phase difference between these two pulse trains is within a range from 2 to 4π, the reversible counter 17 will indicate n−2 and n−1 alternately. If the phase difference is further increased greater than that range within the range of 4π to 6π, the reversible counter will indicate n−3 and n−2 alternately. Therefore, the phase difference can be obtained by detecting the alternate computation of the reversible counter 17 and their respective indication holding time.

As shown in FIG. 3, the control signal matching the computation of the reversible counter 17 is, in the invention, applied to the said frequency converting circuit (or thin-out circuit) 19 and the frequency conversion factor (or thin-out factor) is changed in accordance with the computation of the reversible counter 17 and thereby the repetition frequency of the output pulse signal of the said clock pulse generator 18 is converted and in turn modified in accordance with the output from counter 17. Therefore, the repetition frequency of the output pulse signal converted with the said frequency converting circuit 19 matches the computation of the reversible counter 17. Because of this, when supplying the converted pulse signal of the circuit 19 to the counter 20 and allowing it to count for a predetermined period of time, the computation will match the computation of the reversible counter 17 and its holding time, and thereby the phase difference can be obtained.

The phase difference can be indicated as an electrical angle by selecting properly the relationship between the computation of the counter 20 and its indication. Also, the change in a mechanical angle can be directly indicated when using the apparatus according to the invention with the rotating angle detecting apparatus as shown in FIG. 1.

Also, the polarity of the phase difference, i.e., the advance or delay of the phase, can be determined by the computation of the reversible counter 21 after supplying the counter with the carry forward and backward signals from the reversible counter 17 as add and subtract input signals.

Mention has not been made of the number of bits of the reversible counters 17 and 21 hereinbefore.

Referring now to it, suppose the number of bits of the reversible counter 17 is, for example, 1, the carry forward (or backward) signal is transferred by the reversible counter 17 when the add input signal (or subtract input signal) to be provided continuously exceeds 1 bit and thereby the reversible counter 21 is actuated and thus the range of an angle being measured, i.e., 2 π + θ or 4 π + θ, is indicated. If the number of bits of the reversible counter 17 is great, the measurement of an angle can be achieved without using the reversible counter 21 as far as the computing input is within the range of the bits.

Figure 5:
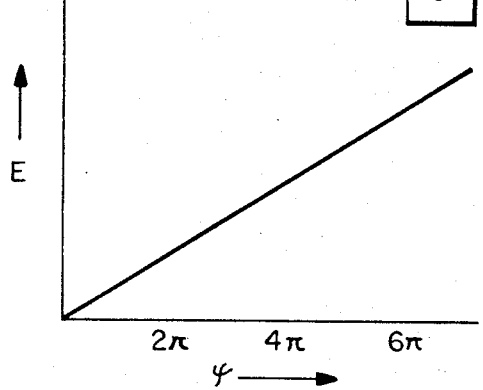
FIG. 5 illustrates a curve for explaining the theory of operation of the said apparatus according to the invention wherein the final indication is made in the form of an analog signal.

Described hereinbefore is the case in which a phase difference is digitally detected and measured. In addition to the digital indication, the computation of the reversible counter 17 can be analogically indicated with, for example, a voltmeter after converting it into the equivalent analog. In such an analog indication as this, there is a proportional relationship between a phase difference φ and the average time of the analog converted voltage E (the average over a great number of cycles of the computation of the reversible counter 17 and the holding time of the computation in one cycle), as shown in FIG. 5 (wherein, X axis is phase difference φ and Y axis is voltage E).

Referring to FIG. 3, the drawing illustrates a case in which the said clock pulse generators 14 and 18 are installed separately. It can be so constructed, however, that these clock pulse generators can be used commonly.

I claim:

1. Apparatus for measuring electrical phase differences between two AC signals of the same frequency wherein the phase difference between the signals may be smaller or greater than 2 π radians comprising:
   first and second circuit means for phase matching the frequencies and phase of the two AC signals and for forming pulse signals having a repetition frequency corresponding to the frequency of said AC signals, first and second flip-flop means each having a set input and a reset input, means connecting the set input of said first flip-flop means to said first circuit means for receiving the pulse signals from said first circuit means, means connecting the set input of said second flip-flop means to said second circuit means for receiving said pulse signals from said second circuit means, a first clock pulse generator having a first output electrically connected to the reset input of said first flip-flop means and a second output electrically connected to the reset input of said second flip-flop means to thereby reset said first and said second flip-flop means in response to the output pulses of said first clock pulse generator;

a first reversible counter having an add input and a subtract input, a first output for providing either a carry forward signal or a carry backward signal and a second output for providing a control signal corresponding to the computation of said reversible counter, means for connecting the output signals from one of said flip-flop means to the add input and the output signals from the other of said flip-flop means to the subtract input, a second clock pulse generator, a frequency converting circuit having a first and a second input, means for connecting the second output of said first reversible counter to said first input and the output of said second clock pulse generator to said second input, said frequency converting circuit being operable to change the repetition frequency of its output signal in accordance with the computation of said first reversible counter and a counter connected to receive the output signals of said frequency converting circuit.

2. Apparatus as set forth in claim 1 further including a second reversible counter connected to the first output of said first reversible counter and operable to respond to the carry forward signal to perform an add computation and to the carry backward signal to perform a subtract operation.

3. Apparatus as set forth in claim 1 further including phase inverter means having an input connected to receive the output of said first clock pulse generator and an output connected to the reset input of said second flip-flop means.

4. Apparatus for measuring electrical phase differences between two AC signals of the same frequency wherein the phase difference between the signals may be smaller or greater than $2\pi$ radians comprising:

first and second circuit means for phase matching the frequencies and phase of the two AC signals and for forming pulse signals having a repetition frequency corresponding to the frequency of said AC signals, first and second flip-flop means each having a set input and a reset input, means for connecting the set input of said first flip-flop means to receive said pulse signals from said first circuit means to thereby set said flip-flop circuit, means connecting the set input of said second flip-flop means for receiving said pulse signals from said second circuit means to thereby set said second flip-flop means, a first clock pulse generator means having a first output for providing reset signals to said flip-flop circuits, means electrically connecting the reset input of said first and said second flip-flop means to the output of said first clock generator, a first reversible counter connected to receive the output signals from one of said flip-flop means as an add input signal and the output signal from the other of said flip-flop means as a subtract signal and being operable in response to said add and subtract signals to thereby perform an arithmetic computation and provide a control signal at one output and a carry forward or a carry backward signal at a second output, a second reversible counter connected to the second output and being operable to respond to the carry forward signal of said first reversible counter to perform an add operation and to the carry backward signal of the reversible counter to perform a subtract operation, means for converting the computation of said first reversible counter into the form of an analog signal and indicator means responsive to said analog signal for providing an indication corresponding to the output of said converting circuit.

5. Apparatus for measuring electrical phase differences between two AC signals of the same frequency comprising first and second means for developing pulse signals corresponding to the frequency and phase of two AC signals being measured, a first and a second flip-flop circuit, means for applying individually to said flip-flop circuits the output pulse signals from the said first and second means for setting said first and said second flip-flops, respectively, a clock pulse generator having outputs connected to said flip-flop circuits for resetting said flip-flop circuits, a first reversible counter, means for applying to said counter the output signals of the said first flip-flop circuits as an add input signal and the output signals of said second flip-flop circuit as a subtract input signal, and means for developing the time mean value of the state of said first reversible counter.

6. Apparatus as set forth in claim 5 wherein said means for developing the time mean value includes a frequency converting circuit, means for applying to said frequency converting circuit a clock signal and means connecting said frequency converting circuit to the output of said first counter such that the output pulse train from said frequency converting circuit is integrated over a period of time in comparison with the repetitive period of said AC signals.

7. Apparatus as set forth in claim 6 further including a second reversible counter having its input connected to the output of said first reversible counter such that the carry forward and carry backward signals of said first reversible counter are received as add input and subtract input commands, respectively.

* * * * *